United States Patent [19]
Murray et al.

[11] Patent Number: 6,029,698
[45] Date of Patent: Feb. 29, 2000

[54] AIR REGULATOR VALVE FOR VENTILATED CAGE AND RACK SYSTEM

[75] Inventors: Dale Murray, Elkton; John E. Sheaffer, Perryville; Ronald W. Hardesty, Bel Air, all of Md.

[73] Assignee: Lab Products, Inc., Seaford, Del.

[21] Appl. No.: 09/098,934

[22] Filed: Jun. 17, 1998

[51] Int. Cl.[7] ........................................ F17D 3/01
[52] U.S. Cl. .................. 137/601; 251/149.6; 251/285
[58] Field of Search .................. 137/601; 251/149.6, 251/149.2, 285

[56] References Cited

U.S. PATENT DOCUMENTS

| | | | |
|---|---|---|---|
| 3,127,148 | 3/1964 | Collar | 251/149.2 |
| 3,147,768 | 9/1964 | Kennedy | 137/601 |
| 3,561,725 | 2/1971 | Torres | 251/149.2 |
| 3,592,240 | 7/1971 | Hedrick et al. | 137/601 X |
| 3,921,900 | 11/1975 | Cole | 137/601 X |
| 4,289,295 | 9/1981 | Allread | 251/149.2 |
| 4,586,694 | 5/1986 | Jones | 251/149.2 |

*Primary Examiner*—Stephen M. Hepperle
*Assistant Examiner*—John Bastianelli
*Attorney, Agent, or Firm*—Stroock & Stroock & Lavan LLP

[57] ABSTRACT

A device for regulating exhaust air flow in a ventilation system when a rack is removed from the system. The device includes a housing forming an air conduit. A valve is mounted in the housing with the valve being moveable between an open position when the device is connected to the rack, and in one of a plurality of partially preset closed positions when the device is not connected to the rack. A valve adjustment member selects the one of a plurality of partially closed positions and is preset during factory testing. When valve is installed at facility and valve is removed from rack the adjustment is fully automatic. The technician merely disconnects the exhaust drop hose with valve attached, and valve automatically adjusts to a preset back pressure duplication position (partially closed position).

11 Claims, 3 Drawing Sheets

AIR REGULATOR VALVE FOR VENTILATED CAGE AND RACK SYSTEM

BACKGROUND OF INVENTION

This invention relates generally to an air regulator valve for a ventilated cage and rack system and, in particular, to an air regulator valve for maintaining the balance of exhaust air pressure provided to a plurality of racks connected to a room ventilation system when a rack or racks are disconnected.

Ventilated cage and rack systems are well known in the art. One such ventilated cage and rack system is disclosed in U.S. Pat. No. 4,989,545, assigned to Lab Products, Inc., in which an open rack system including a plurality of shelves, each formed as an air plenum is provided. Air ventilation is provided directly to animals within each cage by allowing air to travel within each shelf to a plurality of predetermined positions within the rack. Exhaust ventilation is provided to the racks by a room exhaust ventilation system. Generally, a facility exhaust ventilation system is capable of supporting a plurality of racks and includes a common exhaust blower unit to maintain the exhaust air pressure to all the racks.

A drawback of connecting multiple racks to a facility exhaust ventilation system, in the manner done in the prior art, is that when one rack is either connected or disconnected from the facility exhaust system, the pressure drop of the room exhaust system is changed and as a result the balance of exhaust air pressure to the remaining racks is adversely affected. Therefore it is desirable to provide a system in which the balance of exhaust air pressure provided to the remaining racks is not affected each time racks are disconnected from the facility exhaust system.

SUMMARY OF THE INVENTION

The present invention is for an air regulator valve disposed between the rack and room exhaust ventilation system for maintaining the balance of exhaust air pressure provided to the racks of a ventilated cage and rack system. In accordance with the present invention, the air regulator valve includes a housing connected to a facility exhaust ventilation system. The housing forms an air conduit. A valve is mounted in the housing. The valve is movable between an open position for allowing exhaust air to pass through the housing and one of a plurality of closed positions for preventing varying levels of exhaust air from passing through the housing. A valve actuator is included for moving the valve into the open position when the housing is connected to a rack. A valve adjustment member is included for selecting the one of a plurality of closed positions.

When a rack is connected to the air regulator valve thereby causing the valve to be placed in the open position, exhaust air flow between the rack and the facility exhaust ventilation system is substantially unimpeded by the valve and the load placed on the exhaust ventilation system is essentially the load of the rack. When the rack is disconnected from the air regulator valve and the valve is thereby biased in a pre-set closed position, exhaust air flow in the facility exhaust ventilation system is impeded by the air regulator valve in a manner that simulates the load of the disconnected rack so that it appears to the ventilation system as if the rack is still connected. In this way, the total load placed on the ventilation system is constant and the balance of exhaust air pressure to the remaining racks is not affected when a rack is disconnected from the exhaust ventilation system.

Accordingly, it is an object of the present invention to provide an improved exhaust air balance to a facility supplied exhaust air system.

Another object of the invention is to provide an air regulator valve which maintains the overall load to the ventilation system when a particular rack is either removed from or connected to the exhaust ventilation system without being reset each time, the valve automatically adjusts to a preset condition when placed on the housing unit.

Still other objects and advantages of the invention will in part be obvious and will in part be apparent from the specification.

The invention accordingly comprises the features of construction combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
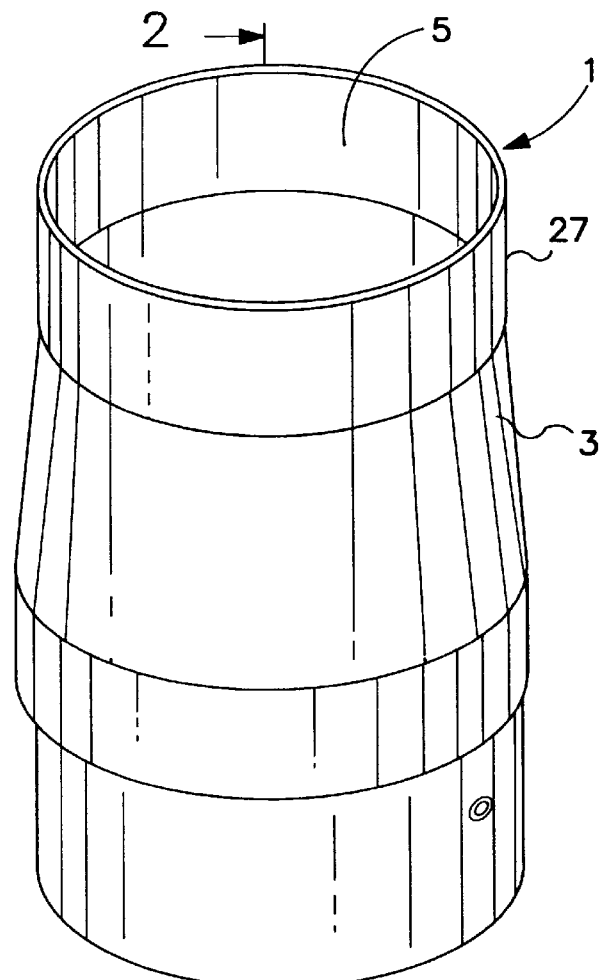
FIG. 1 is a perspective view of an air regulator valve constructed in accordance with the present invention.
Figure 3:
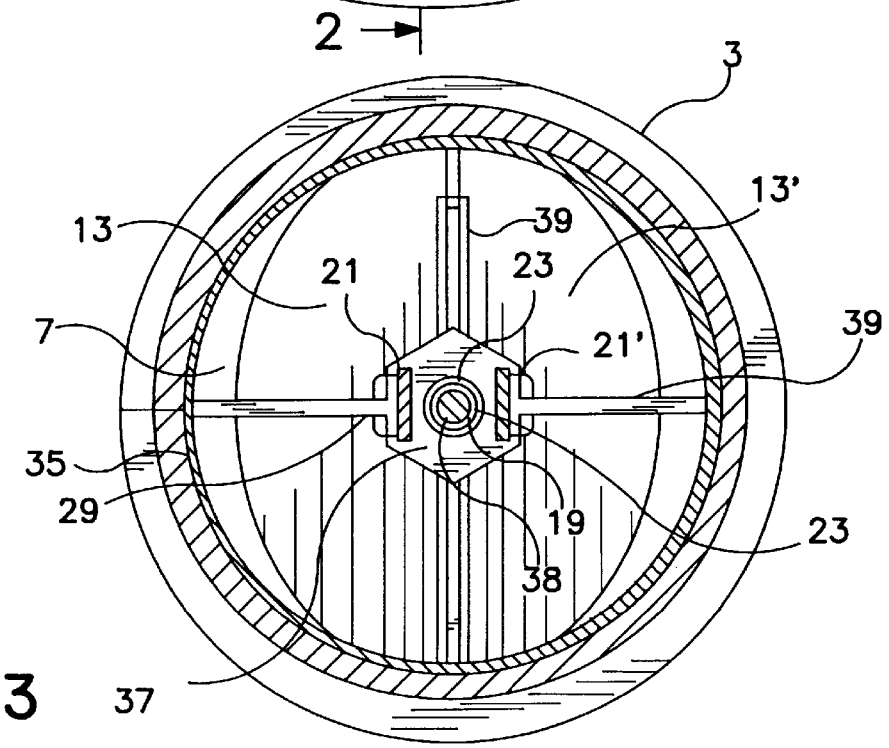
FIG. 3 is a cross-sectional view of the air regulator valve taken along line 3—3 of FIG. 2.

Referring to FIGS. 1 and 3, there is shown an air regulator valve 1 made in accordance with the present invention. Air regulator valve 1 includes a housing 3 having an air exhaust opening 5 at one end and an air intake opening 7 at a second end of housing 3. Intake opening 7 is in fluid communication with air exhaust opening 5 at the other end. In an exemplary embodiment, housing 3 is cone-shaped and includes a mounting portion 27. Air exhaust opening 5 is formed in mounting portion 27 and preferably has a diameter in the range of 3 to 6 inches so that housing 3 can be connected to an ventilation system exhaust hose 11 using a standard stainless steel clamp.

A valve 9 is mounted in housing 3. In an exemplary embodiment, valve 9 is a butterfly valve and is constructed from a pair of plates 13, 13'. Plates 13, 13' are connected to and pivotable around a pivot member 31. Pivot member 31 is positioned along the diameter of housing 3 with each end being fixed to the inside walls of housing 3.

Plates 13, 13' of valve 9 are pivotable between an open position in which plates 13, 13' are in a substantially facing relationship (0°) with each other and a closed position in which plates 13 and 13' extend between walls of housing 3; 180° relative to each other. Plates 13, 13' are dimensioned and sized so that in the 180° closed position substantially all the air entering into either end of housing 3 is prevented from exiting housing 3 through exhaust opening 7. A plate biasing member 33 is mounted on pivot member 31 for biasing plates 13, 13' to the 180° closed position. In an exemplary embodiment, plate biasing member 33 is a torsional spring having sufficient force for biasing plates 13, 13' to the 180° closed position.

A valve opening member 29 is mounted in housing 3 intermediate valve 9 and air intake opening 7 for adjusting the position of valve 9. In an exemplary embodiment, valve opening member 29 includes a ring 35 having a diameter that is slightly less than the inside diameter of housing 3 adjacent air intake opening 7 so as to be slideably moveable within housing 3. A center support member 37 is disposed in the center of ring 35. Ring 35 is attached to center support member 37 via a plurality of radial arms 39. Perpendicularly connected to center support member 37 and facing towards plates 13, 13' are a pair of legs 21, 21'. Each of legs 21, 21' is positioned in a respective half of housing 3 formed by the bisection of housing 3 by pivot member 31. A stop 45, which by way of non-limiting example can be a metal plate, is disposed on the inside portion of housing 3 intermediate valve opening member 29 and valve 9 for limiting the movement of valve opening member 29 towards valve 9. In this way, when valve opening member 29 is moved towards valve 9, legs 21, 21' contact respective plates 13, 13' causing plates 13, 13' to pivot around pivot member 31.

Air regulator valve 1 also includes a valve adjustment member 15 for maintaining valve 9 in one of a plurality of partially closed positions between the open position and 180° closed position. In an exemplary embodiment, valve adjustment member 15 includes a support bracket 43 intermediate valve 9 and center support 37 of valve opening member 29. Support bracket 43 is connected to the inside surface of housing 3 via a plurality of arms 54 radiating from a central portion 50 of support bracket 43. Central portion 50 of support bracket 43 has a pair of slits 52 formed therein that slideably receive legs 21, 21', respectively.

An adjustment rod 23 is perpendicularly connected to center portion 50 of support bracket 43, passes through a hole 38 in center support 37 and extends out through air intake opening 7. In a preferred embodiment, adjustment rod 23 extends beyond air intake opening 7 approximately one inch.

A biasing member 17, in a preferred embodiment, a helical spring, is disposed on the portion of adjustment rod 23 intermediate center support 37 and center 50 of support bracket 43. A sleeve 19 is disposed on the portion of adjustment rod 23 intermediate center support 33 and air intake opening 7. The length of sleeve 19 is such that a portion of adjustment rod 23 in the direction of air intake opening 7 is visible beyond sleeve 19. The diameter of sleeve 19 is such that when sleeve 19 is moved toward center support 37, the circumference of sleeve 19 contacts center support 37.

Rod 23 is threaded. An adjustment knob 41 is adjustably attached to adjustment rod 23. Adjustment knob 41 is dimensioned and shaped so that when knob 41 is moved towards sleeve 19, knob 41 contacts the circumference of sleeve 19. In a preferred embodiment, adjustment knob 41 is a threaded nut and the portion of adjustment rod 23 that extends beyond the hole in center support 37 is also threaded so that by twisting knob 41 in either the clockwise or counter-clockwise directions, knob 41 moves along adjustment rod 23 either towards valve 9 or away from valve 9, respectively.

Figure 2:
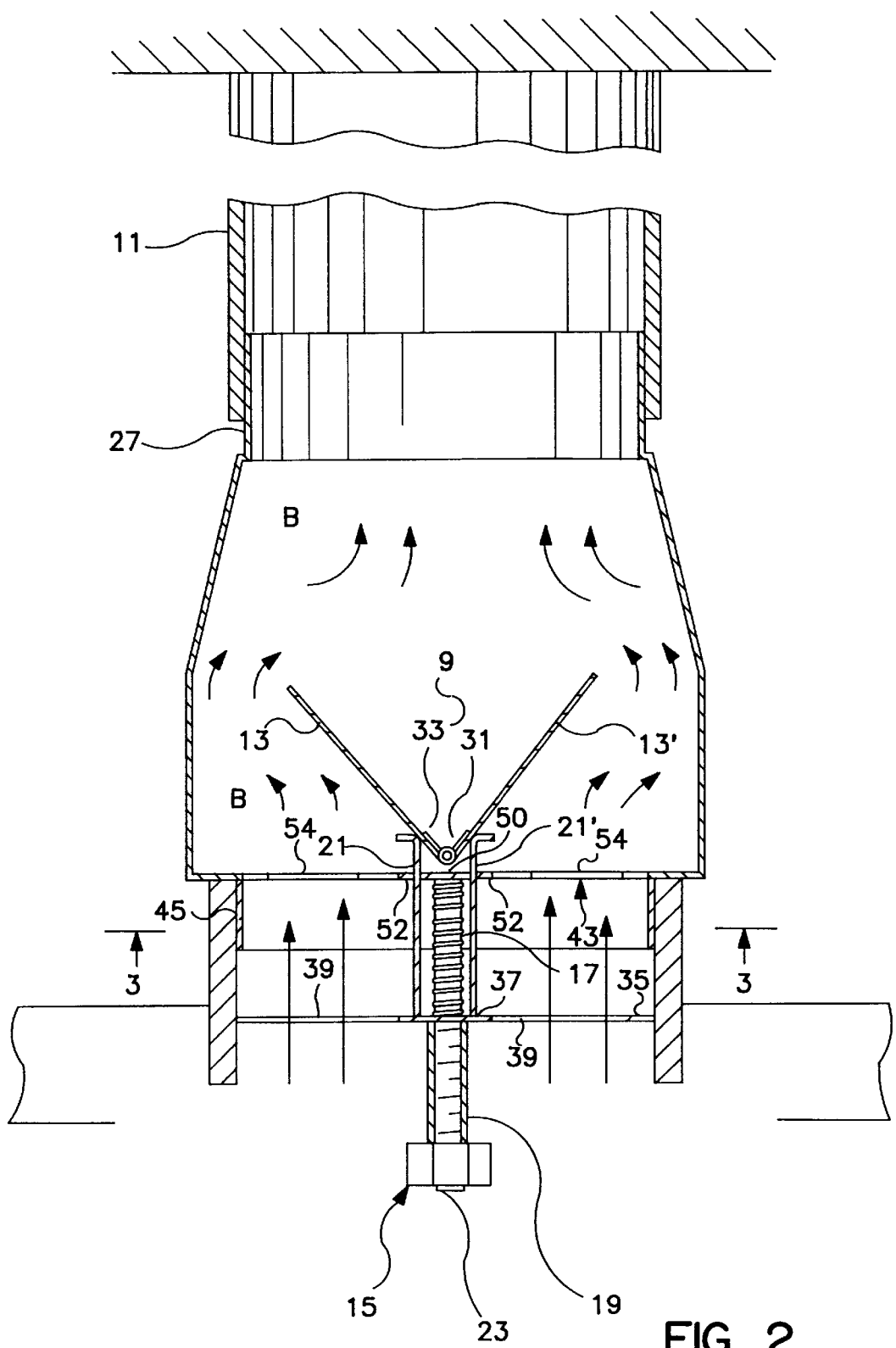
FIG. 2 is a cross sectional view of the air regulator valve taken along line 2—2 of FIG. 1 in a closed position.
Figure 4:
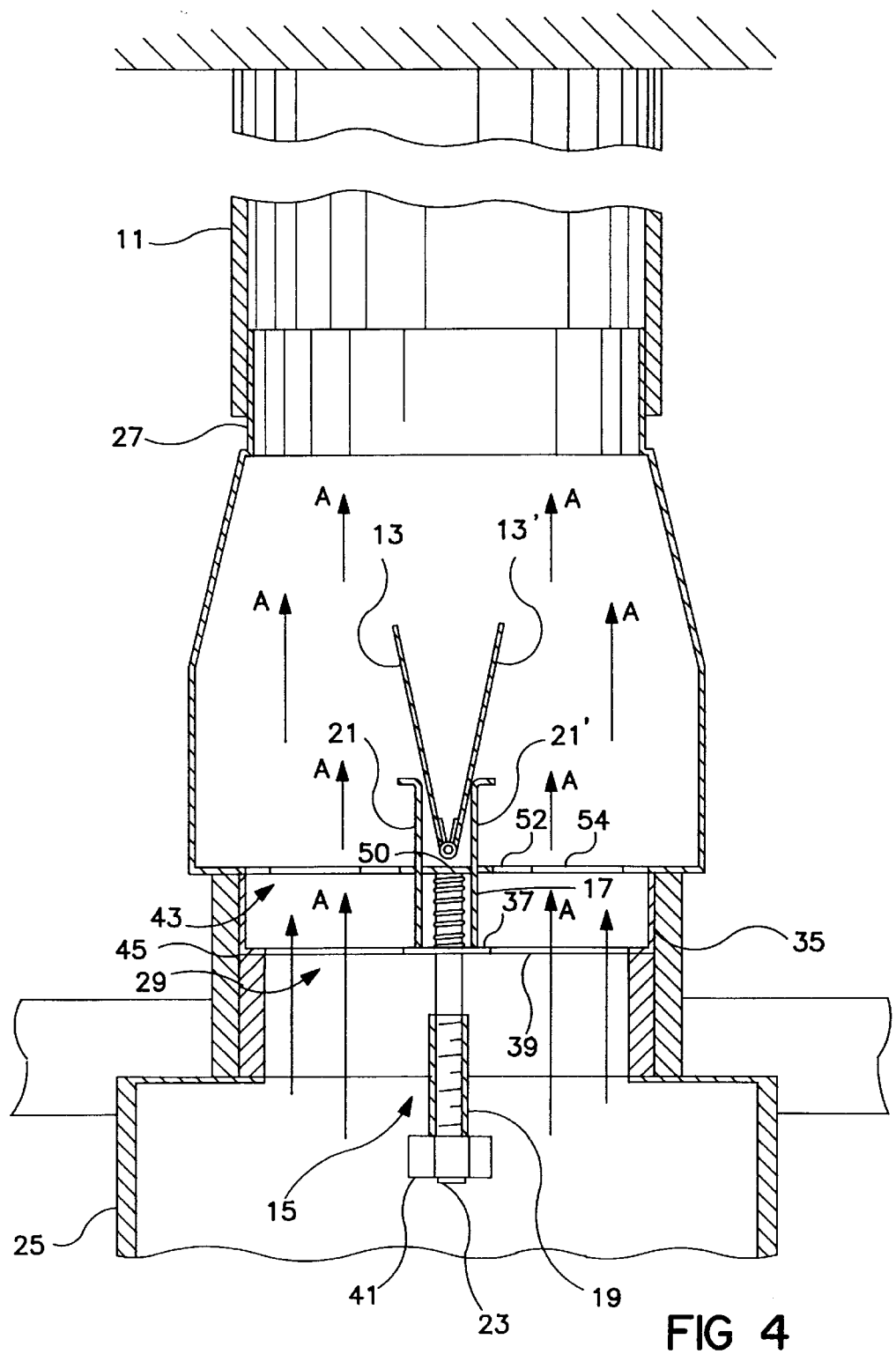
FIG. 4 is a cross sectional view of the air regulator valve taken along line 2—2 of FIG. 1 in an opened position.

Referring now to FIGS. 2 and 4, the operation of air regulated valve 1 will be described. Air exhaust opening 5 of housing 3 of air regulated valve 1 is connected to exhaust hose 11 of the ventilation system via a stainless steel clamp. Ventilation port 25 associated with the rack to be ventilated is forcefully inserted into intake air opening 7 of housing 3. When inserted, the outer circumference of ventilation port 25 contacts valve opening member 29 and pushes valve opening member 29 towards support bracket 43 and against biasing member 17. As a result, legs 21, 21' contact plates 13, 13' causing plates 13, 13' to rotate around pivot member 31 thereby placing valve 9 in the open position. In the open position, air flows between the ventilation system and the connected rack through air regulator valve 1 in the direction of arrows A (FIG. 4). The air pressure load placed on the ventilation system as a result of the rack being connected to the ventilation system corresponds to the air pressure load of the associated rack.

When ventilation port 25 is removed from air regulator valve 1, i.e. the associated rack is disconnected from the ventilation system, biasing member 17 biases center support member 37 towards air intake opening 7 and legs 21, 21' move away from plates 13, 13'. The torsional force of plate bias member 33 forces plates 13, 13' to rotate away from each other and around pivot member 31 resulting in valve 9 moving from the opened position to a preset partially closed position. When in this partially closed position, the air flow through air regulator valve 1 is impeded by plates 13, 13' in a manner such that the air pressure load presented to the ventilation system by air regulator valve 1 is substantially similar to the air pressure load of the rack placed on the ventilation system when the rack was connected. In this way, the ventilation system is not aware that the rack was disconnected and the balance of air pressure provided to the other racks connected to the ventilation system is not disturbed.

The position of plates 13, 13' when valve 9 is placed in the closed position can be adjusted so that the air pressure resistance provided by air regulator valve 1 can be adjusted to be substantially equal to the air pressure load of any given rack. The load presented by air regulator valve 1 to the ventilation system corresponds to the position of plates 13, 13' when in the closed position. The position of plates 13, 13' in the closed position are adjusted by adjusting knob 41 on adjustment rod 23. In an exemplary embodiment, this is done by rotating knob 41 in either a clockwise direction, to advance knob 41 towards sleeve 19, or a counter-clockwise direction, so that knob 1 retracts from sleeve 19. As knob 41 advances toward sleeve 19, knob 41 contacts sleeve 19 which in turn contacts center bracket 37 of valve opening member 29 which causes valve opening member 29 to move towards support bracket 43. In effect, knob 41 acts as a stop to sleeve 19 which in turn acts as a stop to valve opening member 29. As a result, legs 21, 21' contact plates 13, 13' stopping rotation of plates 13, 13' around pivot member 31 at a predetermined orientation between open and 180° closed. Adjustment knob 41 is moved to a point on adjustment rod 23 so that plate 13, 13' are set to a closed position in which the air pressure resistance created by air regulated valve 1 is substantially equivalent to the air pressure resistance of the particular rack, such as shown in FIG. 2. Thus, when the rack is removed from the ventilation system, the valve will be biased by plate biasing member 33 to the selected closed position and the balance of air pressure to the remaining racks connected to the ventilation system will not be adversely affected.

The adjustment of adjustment knob 41 to a preset opening which simulates the back pressure of a particular rack may be performed at the factory. When air regulator valve 1 is removed from the rack, air regulator valve 1 remains connected to the exhuast drop hose and automatically adjusts to the preset back pressure position without the need for adjustment by the user.

As can be seen at the object set forth above, those apparent from the preceding description, are efficiently attained and, because certain changes may be made in the above construction without departing from the spirit and scope of the invention, it is intended that all matter contained in the above description are shown in the accompanying drawings shall be interpreted as less driven not in an limiting sense.

It is also to be understood that the following claims are intended to cover all the generic and specific features of the invention herein described, and all statements of the scope of the invention, which as matter of language, might be said to fall therebetween.

We claim:

1. A device for regulating air flow between a ventilation system and a rack, comprising:
   a housing forming an air conduit between an exhaust opening and an entrance opening, said housing connected to said ventilation system;
   a valve mounted in said housing, said valve including a pivot member mounted in said housing and a pair of plates, said plates being pivotably mounted on said pivot member; said valve positionable between an open position for allowing air flow through said conduit, and one of a plurality of partially closed positions for providing a load to said ventilation system;
   a valve adjustment member for holding said valve into one of a said plurality of partially closed positions intermediate said open position and said predetermined closed position; and
   a valve opening member slideably mounted in said housing intermediate said valve and said air intake opening for adjusting the position of the valve, said valve opening member further including a ring slideably mounted in said housing, said ring having a center; a center support member disposed in said center of said ring; a plurality of radial arms connecting said center support member to said ring; a pair of legs fixed to said center support member and perpendicular to said ring; a first of said pair of legs adjacent a first of said pair of plates and a second of said pair of legs adjacent a second of said pair of plates, wherein when said valve opening member slides towards said valve, said pair of legs cause said pair of plates to pivot around said pivot member.

2. The device of claim 1 wherein said pair of legs pivots said plates into said open position when said rack is connected to said housing.

3. The device of claim 1 wherein when said valve is in said open position, said air flow through said housing is substantial unimpeded by said valve.

4. The device of claim 1 wherein when said valve is in said one of a plurality of partially closed positions, said air flow through said house is impeded by said valve.

5. The device of claim 1 wherein said valve adjustment member slideably moves said valve opening member towards said valve for selecting said one of said plurality of partially closed positions.

6. The device of claim 1 wherein said center support member has a hole and said valve adjustment member further comprises a support bracket disposed in said housing intermediate said valve and said valve opening member, said support bracket having a center portion; an adjustment rod having a first end and a second end, said first end being fixed to said center portion, said adjustment rod extending through said hole in said center support member, and a knob adjustably fixed to said adjustment rod intermediate said center support member and said second end so that when said knob is adjusted towards said valve opening member, said pair of legs position said pair of plates to pivot into said one of a plurality of partially closed positions.

7. The device of claim 6 wherein said adjustment rod and said knob are a threaded pair and said valve adjustment member is adjusted by rotating said knob.

8. The device of claim 6 further comprising a biasing member intermediate said center portion and said center support member for biasing said valve opening member away from said valve.

9. A device for regulating air flow between a ventilation system and a rack, comprising:
   a housing forming an air conduit between an exhaust opening and an entrance opening, said housing connected to said ventilation system;
   a valve mounted in said housing, said valve positionable between an open position for allowing air flow through said conduit, and one of a plurality of partially closed positions for providing a load to said ventilation system, said valve including a pivot member mounted in said housing and a pair of plates, said plates being pivotably mounted on said pivot member;
   a valve adjustment member for holding said valve into one of a said plurality of partially closed positions; and
   a plate biasing member disposed on said pivot member for biasing said plates to said one of a plurality of partially closed positions, said load in said partially closed position simulating the load of said rack connected to said ventilation system.

10. A device for regulating air flow between a ventilation system and a rack, comprising:
    a housing forming an air conduit between an exhaust opening and an entrance opening, said housing connected to said ventilation system;
    a valve mounted in said housing, said valve positionable between an open position for allowing air flow through said conduit, and one of a plurality of partially closed positions for providing a load to said ventilation system; and
    a valve adjustment member for holding said valve into one of a said plurality of partially closed positions, said device being connected to said rack when said valve is in said open position.

11. A device for regulating air flow between a ventilation system and a rack, comprising:
    a housing forming an air conduit between an exhaust opening and an entrance opening, said housing connected to said ventilation system;
    a valve mounted in said housing, said valve positionable between an open position for allowing air flow through said conduit, and one of a plurality of partially closed positions for providing a load to said ventilation system; and
    a valve adjustment member for holding said valve into one of a said plurality of partially closed positions, said device not being connected to said rack when said valve is in said closed position.

* * * * *